United States Patent
Ravimohan et al.

(10) Patent No.: US 9,983,829 B2
(45) Date of Patent: May 29, 2018

(54) PHYSICAL ADDRESSING SCHEMES FOR NON-VOLATILE MEMORY SYSTEMS EMPLOYING MULTI-DIE INTERLEAVE SCHEMES

(71) Applicant: SanDisk Technologies Inc., Plano, TX (US)

(72) Inventors: Narendhiran Chinnaanangur Ravimohan, Bangalore (IN); Muralitharan Jayaraman, Bangalore (IN)

(73) Assignee: SanDisk Technologies LLC, Plano, TX (US)

(*) Notice: Subject to any disclaimer, the term of this patent is extended or adjusted under 35 U.S.C. 154(b) by 105 days.

(21) Appl. No.: 14/994,667

(22) Filed: Jan. 13, 2016

(65) Prior Publication Data

US 2017/0199703 A1 Jul. 13, 2017

(51) Int. Cl.
| | |
|---|---|
| *G06F 3/06* | (2006.01) |
| *G06F 12/06* | (2006.01) |
| *G06F 12/10* | (2016.01) |
| *G06F 12/02* | (2006.01) |
| *G06F 12/1009* | (2016.01) |

(52) U.S. Cl.
CPC ............ *G06F 3/0659* (2013.01); *G06F 3/064* (2013.01); *G06F 3/0616* (2013.01); *G06F 3/0688* (2013.01); *G06F 12/0246* (2013.01); *G06F 12/0607* (2013.01); *G06F 12/1009* (2013.01); *G06F 2212/1032* (2013.01); *G06F 2212/1044* (2013.01); *G06F 2212/2022* (2013.01); *G06F 2212/7201* (2013.01); *G06F 2212/7208* (2013.01); *G06F 2212/7211* (2013.01)

(58) Field of Classification Search
None
See application file for complete search history.

(56) References Cited

U.S. PATENT DOCUMENTS

| 7,715,255 | B2 | 5/2010 | Tu et al. | |
|---|---|---|---|---|
| 9,594,675 | B2* | 3/2017 | Tsai | .................. G06F 12/06 |
| 2005/0141312 | A1* | 6/2005 | Sinclair | ............... G06F 11/1072 365/222 |
| 2008/0086588 | A1* | 4/2008 | Danilak | ................ G06F 13/385 711/103 |

(Continued)

OTHER PUBLICATIONS

International Search Report and Written Opinion for corresponding application No. PCT/US2017/012815 dated Apr. 12, 2017 (14 pages).

*Primary Examiner* — Gary W. Cygiel
(74) *Attorney, Agent, or Firm* — Brinks Gilson & Lione

(57) ABSTRACT

A non-volatile memory system may include a plurality of memory dies and a controller that is configured to write data into the memory dies according to a multi-die interleave scheme. A total number of the dies may be a non-multiple of a die component number of the interleave scheme. The controller may select abstract address based on a virtual die layout, and translate the abstract address to actual physical addresses. The translation may identify actual blocks located in different rows of blocks. The controller may also read data sets from the memory dies. To do so, the controller may translate an abstract address to actual physical addresses, which may similarly identify actual blocks located in different rows of blocks.

20 Claims, 10 Drawing Sheets

(56) References Cited

U.S. PATENT DOCUMENTS

| | | | |
|---|---|---|---|
| 2010/0082917 A1* | 4/2010 | Yang | G06F 12/0246 |
| | | | 711/157 |
| 2010/0174845 A1 | 7/2010 | Gorobets et al. | |
| 2014/0189200 A1* | 7/2014 | Gavens | G06F 12/0607 |
| | | | 711/103 |
| 2014/0189210 A1 | 7/2014 | Sinclair et al. | |
| 2015/0220385 A1 | 8/2015 | Wood et al. | |
| 2015/0347026 A1 | 12/2015 | Thomas | |

* cited by examiner

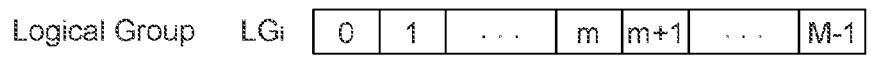
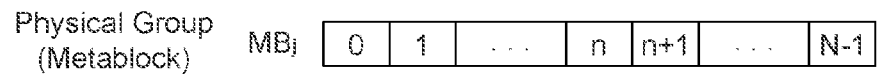
FIG. 5
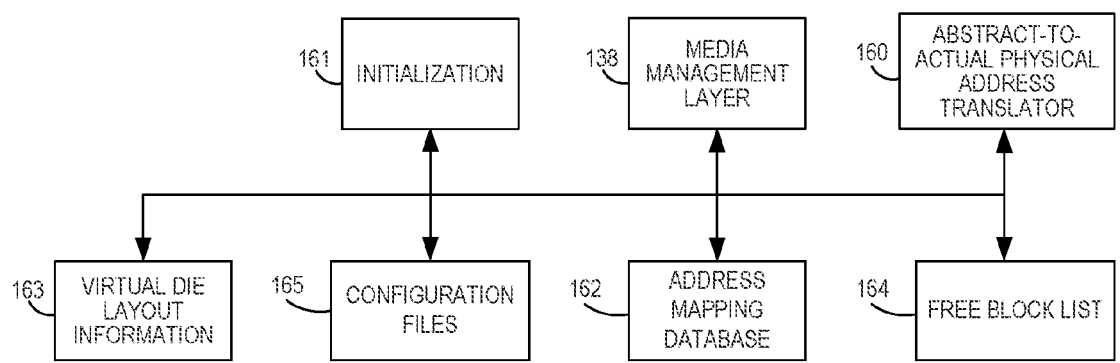
FIG. 6

2

PHYSICAL ADDRESSING SCHEMES FOR NON-VOLATILE MEMORY SYSTEMS EMPLOYING MULTI-DIE INTERLEAVE SCHEMES

BACKGROUND

Non-volatile memory systems may employ a physical addressing scheme to manage storage of data that is different than an addressing scheme employed by the host. In order to keep track of where data is stored, the non-volatile memory system may use a mapping scheme that maps host addresses with physical addresses. The physical addresses mapped to the host address may be abstract addresses in that they do not identify the actual storage locations of the non-volatile memory. Further physical address translation may be performed by the non-volatile memory system to identify the actual physical addresses.

When writing data into the non-volatile memory, the non-volatile memory system may select abstract addresses and then write the data into the actual storage space corresponding to the selected abstract address. In some example configuration, the abstract addresses that are selected may span and/or correspond to multiple dies. In addition, the non-volatile memory system may employ wear leveling to write the data, which in general, may aim to write data into the dies in an evenly-distributed manner. In order to do so, the abstract addresses may be evenly distributed into groups, and the non-volatile memory system may select the abstract addresses from the groups in an evenly distributed manner.

For configurations where the total number of dies of the non-volatile memory is a multiple of the number of dies an abstract address spans, the abstract addresses may be evenly distributed into their groups on the basis of which dies they span. That is, abstract addresses spanning the same dies may be grouped into the same group. Additionally, where the total number of dies is a multiple of the number of dies an abstract address spans, then a mapping between the abstract and actual physical addresses may be employed where all of the actual blocks that an abstract physical address spans may be in the same row of blocks.

However, as packaging requirements change, an optimal number for the total number of dies in the non-volatile system may not be a multiple of a die component number of a desired or chosen multi-die interleave scheme. For these configurations, the abstract addresses may not be able to be grouped on the basis of which dies they span. As such, new ways to map the abstract addresses to actual blocks and distribute the abstract addresses may be needed.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

FIG. 5 is a schematic diagram of an example mapping between logical groups and metablocks.

FIG. 6 is block diagram of components of the non-volatile memory system used to perform host read and write commands.

DETAILED DESCRIPTION

Overview

Figure 1A:
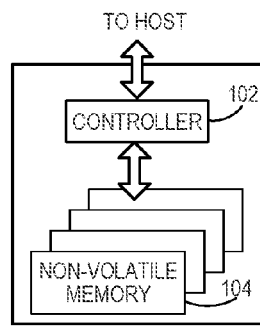
FIG. 1A is a block diagram of an exemplary non-volatile memory system.

By way of introduction, the below embodiments relate to address management for multiple-die non-volatile memory systems that employ a multi-die interleave scheme, where a total number of dies is a non-multiple of the die component number of the multi-die interleave scheme. In one embodiment, a non-volatile memory system may include non-volatile memory comprising a plurality of actual blocks arranged in a plurality of actual dies; and a controller. The controller may be configured to: receive a host write command to write a data set; select a metablock of a plurality of metablocks in which to write the data set; and translate an address of the metablock to a physical address identifying where in the non-volatile memory to write the data set, wherein the physical address identifies a first actual block of a first actual die and a second actual block of a second actual die, and wherein the first block is located in a first row of actual blocks and the second block is located in a second row of actual blocks. In addition, the controller may be configured to communicate with the non-volatile memory to write a first portion of the data set into the first actual block and a second portion of the data set in the second actual block.

In another embodiment, a method for executing host commands in a non-volatile memory system may be performed. The method may include: identifying, with a controller of the non-volatile memory system, a metablock address of a metablock associated with a virtual set of virtual die number and virtual block number pairs in which to write a data set; translating, with the controller, the metablock address of the metablock to an actual physical address identifying an actual set of actual die and actual block pairs of non-volatile memory, wherein the actual set of actual die and actual block pairs is different than the virtual set of virtual die and virtual block pairs; and after translating the metablock address, writing, with the controller, the data set to the actual set of actual die and actual block pairs.

In another embodiment, a non-volatile memory system may include: non-volatile memory comprising a plurality of actual blocks arranged in a plurality of actual dies; and a controller. The controller may be configured to: write data to the plurality of actual blocks according to a multi-die interleave scheme, wherein a total number of the plurality of actual dies is a non-multiple of a die component number of the multi-die interleave scheme; select an available metablock in which to write a data set based on a virtual die layout of the non-volatile memory, the virtual die layout identifying a plurality of virtual blocks associated with the available metablock; and translate a metablock address of the available metablock to an actual physical address that identifies at least one actual block as being different than at least one of the plurality of virtual blocks.

In some embodiments, a number of actual blocks included in the metablock may correspond to a multi-die interleave scheme for the non-volatile memory system, and a total number of the plurality of actual dies of the non-volatile memory may be a non-multiple of a die component number of the multi-die interleave scheme.

In some embodiments, the controller may be configured to select the metablock from a free block list identifying associations between the plurality of metablocks and a plurality of metablock groups according to a wear leveling scheme. The plurality of metablock groups may correspond to a virtual die layout that identifies a total number of virtual dies that is different than the total number of the plurality of actual dies.

In some embodiments, the virtual die layout may identify a plurality of metaplanes. Each of the metablock groups may correspond to one of the plurality of metaplanes.

In some embodiments, a number of the plurality of metaplanes is set to the total number of virtual dies divided by the die component number.

In some embodiments, the metablock comprises a first metablock that is associated with a first metablock group of the plurality of metablock groups. The controller may further be configured to: select a next metablock of the plurality of metablocks in which to write a next data set according to the wear leveling scheme, wherein the next metablock is associated with a second metablock group that is different than the first metablock group.

In some embodiments, the total number of virtual dies is a multiple of the die component number.

In some embodiments, the log base 2 of the total number of virtual dies is an integer, and the log base 2 of the total number of the plurality of actual dies is a non-integer.

In some embodiments, the total number of virtual dies is set to the die component number multiplied by a quotient of the total number of the plurality of actual dies divided by the die component number.

In some embodiments, a number of virtual blocks in each of the virtual dies is set according to a ratio of the total number of the plurality of actual dies to the total number of virtual dies.

In some embodiments, the first and second rows of actual blocks are adjacent to each other.

In some embodiments, the first actual block is a last block of the first row and the second actual block is a first block of the second row.

In some embodiments, the controller may write the data set to the actual set of actual die and actual block pairs according to a multi-die interleave scheme, wherein a total number of a plurality of actual dies of the non-volatile memory is a non-multiple of a die component number of the multi-die interleave scheme.

In some embodiments, the controller may select the metablock from a free block list that associates a plurality of metablocks of the non-volatile memory with a plurality of metablock groups according to a wear leveling scheme, where the plurality of metablock groups may correspond to a virtual die layout that identifies a total number of virtual dies that is different than the total number of actual dies.

In some embodiments, the controller may receive a host read request to read the data set, the read request identifying a host address associated with the data set; access an address data structure that maps the host address to the metablock address in order to identify the metablock address; translate the metablock address to the actual physical address; and read the data set from the actual set of actual die and actual block pairs associated with the actual physical address.

In some embodiments, the controller may select the available metablock from a free block list that identifies associations between a plurality of metablocks and a plurality of metablock groups according to a wear leveling scheme, wherein a number of the plurality of metablock groups is based on a total number of virtual dies identified in the virtual die layout and the die component number of the multi-die interleave scheme.

In some embodiments, the available metablock is associated with a first metablock group of the plurality of metablock groups. The controller may further be configured to select, from the free block list, a next available metablock in which to write a next data set according to the wear leveling scheme, wherein the next metablock is associated with a second metablock group that is different than the first metablock group.

Other embodiments are possible, and each of the embodiments can be used alone or together in combination. Accordingly, various embodiments will now be described with reference to the attached drawings.

Exemplary Embodiments

The following embodiments describe address management for multiple-die non-volatile memory systems that employ a multi-die interleave scheme, where a total number of dies is a non-multiple of the die component number of the multi-die interleave scheme. Before turning to these and other embodiments, the following paragraphs provide a discussion of exemplary non-volatile memory systems and storage modules that can be used with these embodiments. Of course, these are just examples, and other suitable types of non-volatile memory systems and/or storage modules can be used.

FIG. 1A is a block diagram illustrating a non-volatile memory system 100. The non-volatile memory system 100 may include a controller 102 and non-volatile memory that may be made up of a plurality of non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host system and transmit command sequences for read, program, and erase operations to the non-volatile memory dies 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory dies 104 may be any suitable flash interface, such as Toggle Mode 200, 400, or 800. In one embodiment, the memory system 100 may be a card based system, such as a secure digital (SD) or a micro secure digital (micro-SD) card. In an alternate embodiment, the system 100 may be part of an embedded memory system.

Although in the example illustrated in FIG. 1A, the non-volatile memory system 100 may include a single channel between the controller 102 and the non-volatile memory dies 104, the subject matter described herein is not limited to having a single memory channel. For example, in some NAND memory system architectures, 2, 4, 8 or more NAND channels may exist between the controller and the NAND memory dies 104, depending on controller capabilities. In any of the embodiments described herein, more than a single channel may exist between the controller and the memory dies 104, even if a single channel is shown in the drawings.

Figure 1B:
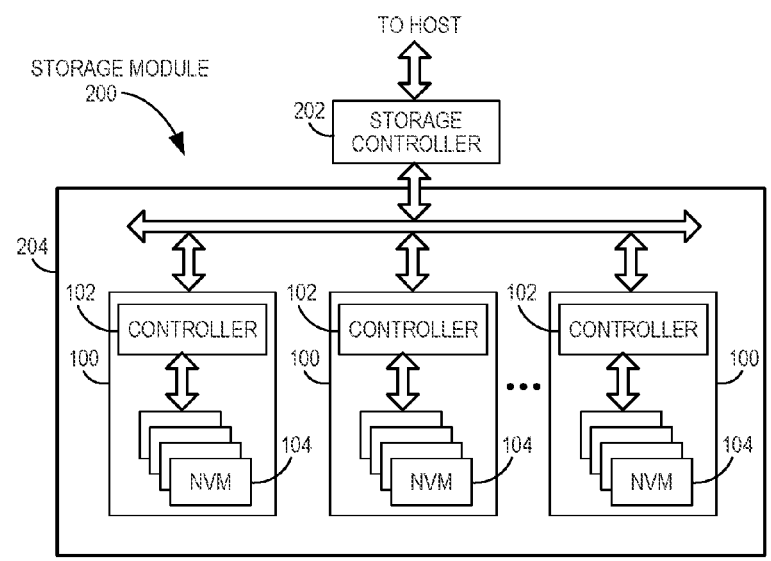
FIG. 1B is a block diagram of a storage module that includes a plurality of non-volatile memory systems.

FIG. 1B illustrates a storage module 200 that includes plural non-volatile memory systems 100. As such, the storage module 200 may include a storage controller 202 that interfaces with a host and with a storage system 204, which includes a plurality of non-volatile memory systems 100. The interface between the storage controller 202 and non-volatile memory systems 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples.

The storage system 200, in one embodiment, may be a solid state drive (SSD), such as found in portable computing devices, such as laptop computers and tablet computers, and mobile phones.

Figure 1C:
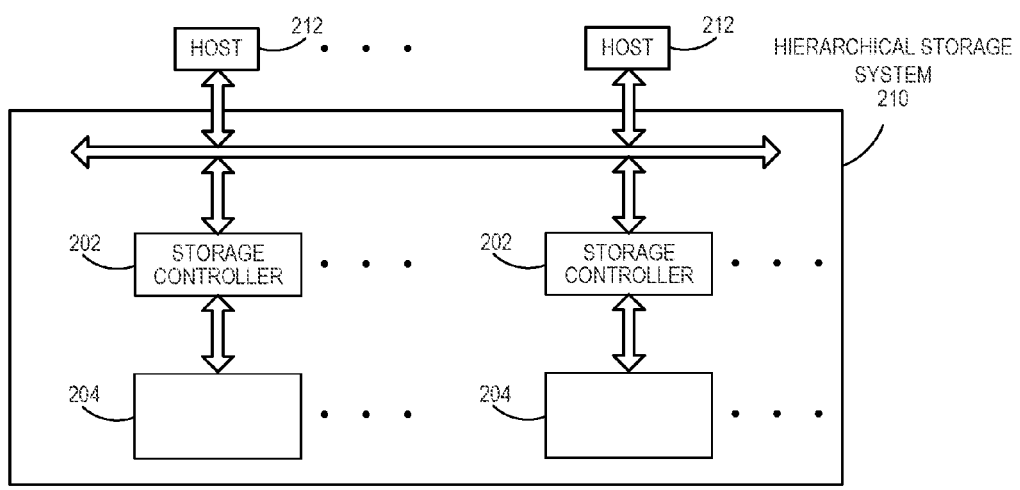
FIG. 1C is a block diagram of a hierarchical storage system.

FIG. 1C is a block diagram illustrating a hierarchical storage system 210. The hierarchical storage system 210 may include a plurality of storage controllers 202, each of which control a respective storage system 204. Host systems 212 may access memories within the hierarchical storage system 210 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the storage system 210 illustrated in FIG. 1C may be a rack mountable mass storage system that is accessible by multiple host computers, such as would be found in a data center or other location where mass storage is needed.

Figure 2A:
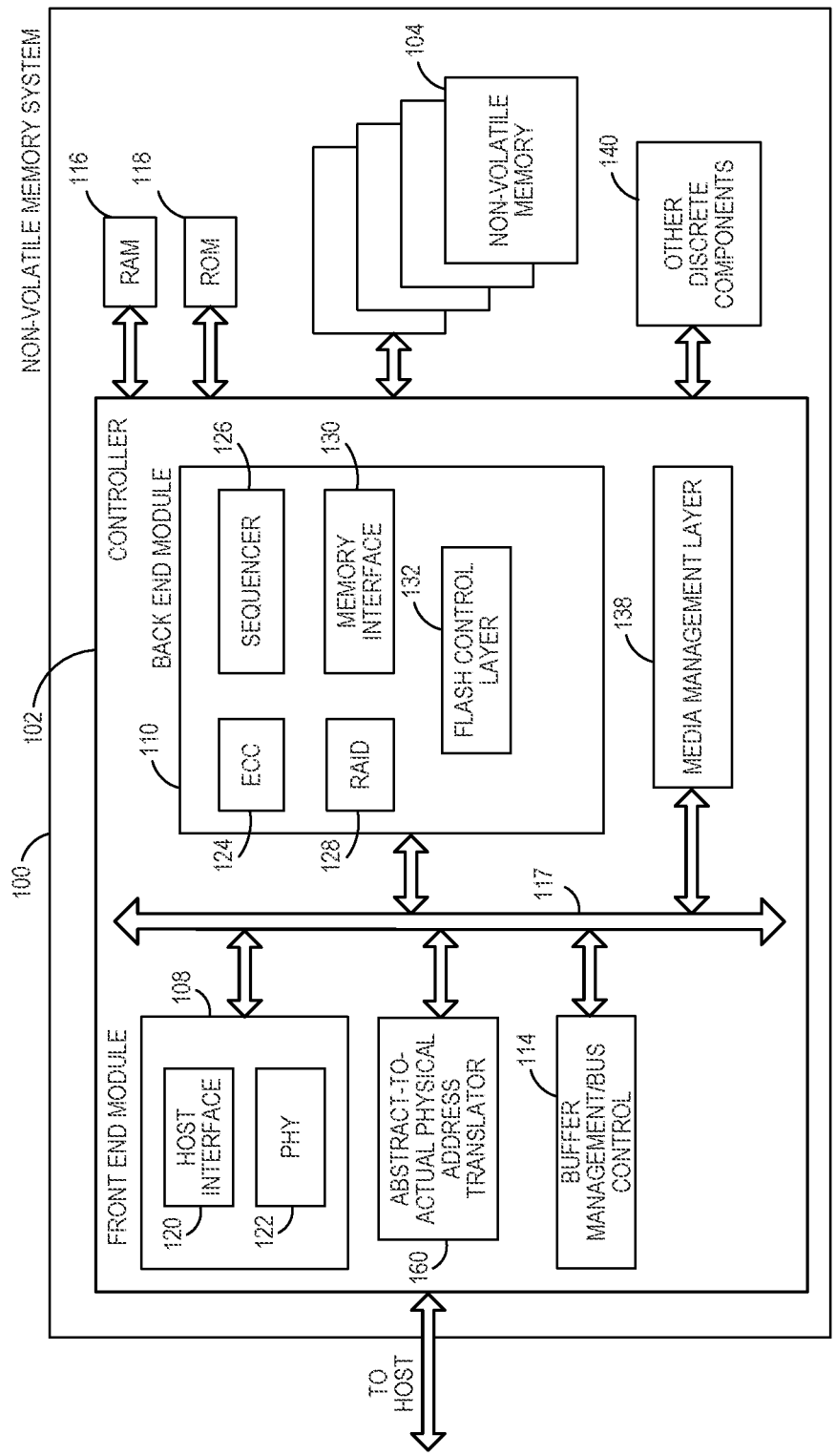
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the plurality of non-volatile memory dies 104, and various other modules that perform various functions of the non-volatile memory system 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus controller module 114 that manages buffers in random access memory (RAM) 116 and controls the internal bus arbitration for communication on an internal communications bus 117 of the controller 102. A read only memory (ROM) 118 may store and/or access system boot code, as described in further detail below. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory 104. The back end module 110 may also include a command sequencer 126 that generates command sequences, such as program, read, and erase command sequences, to be transmitted to the non-volatile memory dies 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences and data to the non-volatile memory dies 104 and receives status information and data from the non-volatile memory dies 104. In one embodiment, the memory interface 130 may be a double data rate (DDR) interface, such as a Toggle Mode 200, 400, or 800 interface. A flash control layer 132 controls the overall operation of back end module 110.

Additional modules of the non-volatile memory system 100 illustrated in FIG. 2A may include a media management layer module 138 and an abstract-to-physical address translation module 160. The media management layer module 138 may be configured to perform various management functions, including upper layer functions and/or those associated with execution of host read and write requests, such as select abstract physical blocks (metablocks) in which to write data and manage mappings between abstract physical addresses and host (logical) addresses. The abstract-to-physical address translation module 160 may be configured translate or convert abstract physical addresses to actual physical addresses. The abstract-to-physical address translation module 160 is shown as a module separate from the other modules of the non-volatile memory system 100, although in other configurations, the address management module 160 may be part of any of the other modules. The media management layer module 138 and abstract-to-physical address translation module 160 are described in further detail below.

The non-volatile memory system 100 may also include other discrete components 140, such as external electrical interfaces, external RAM, resistors, capacitors, or other components that may interface with the controller 102. In alternative embodiments, one or more of the RAID module 128, media management layer 138 and buffer management/bus controller 114 are optional components that may not be necessary in the controller 102.

Figure 2B:
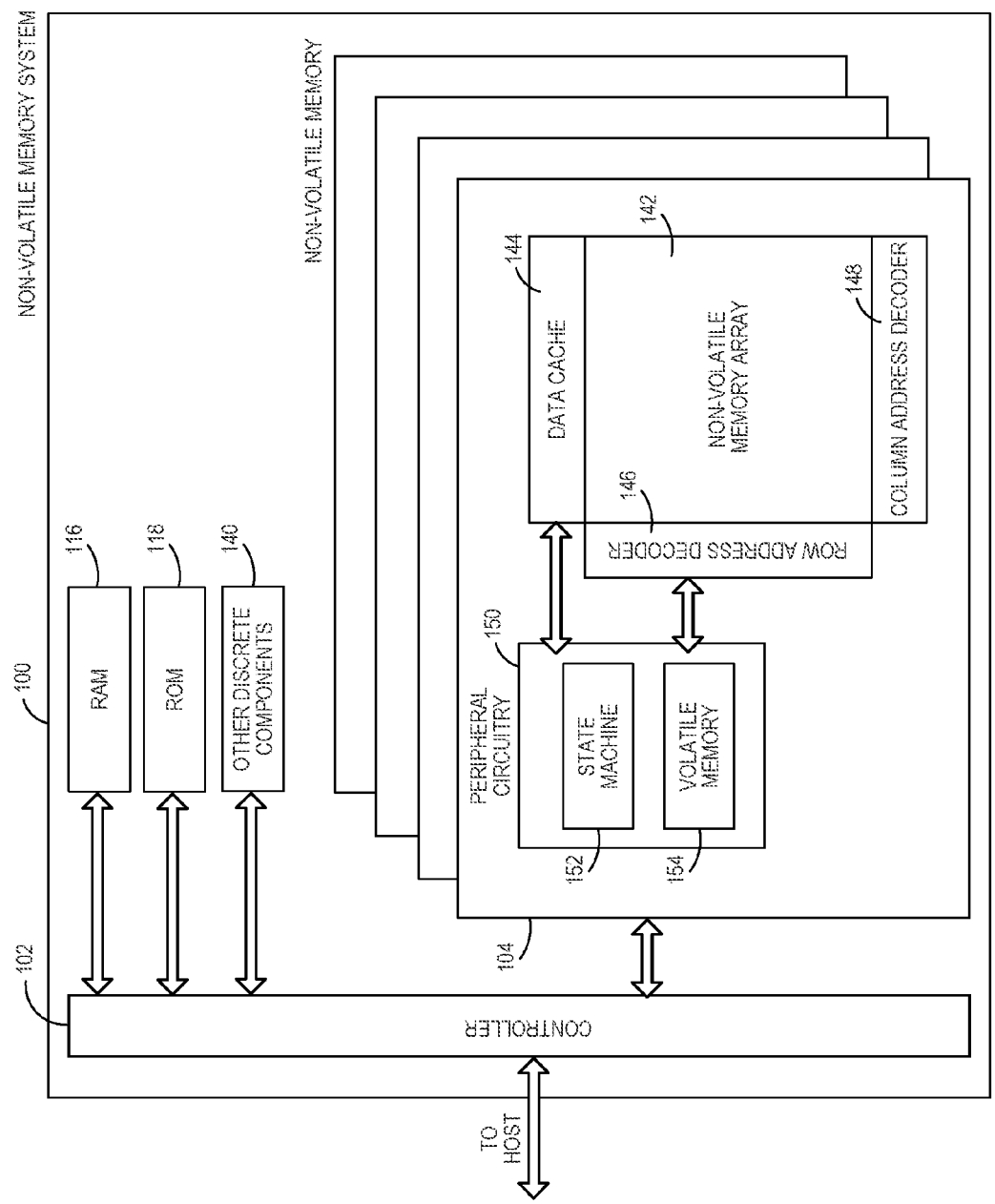
FIG. 2B is a block diagram of exemplary components of a non-volatile memory die of the non-volatile memory system of FIG. 1A.

FIG. 2B is a block diagram illustrating exemplary components of a single non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Whether a memory element is a SLC or a MLC may depend on the number of bits programmed or written into the memory element and/or the number of bits the memory element is storing. For example, if a memory element is storing a single bit of data, then the memory element may be configured as a SLC. Alternatively, if a memory element is storing multiple (two or more) bits of data, then the memory element may be configured as a MLC. Accordingly, each of the memory elements may be configured or programmed in a SLC mode or a MLC mode, as determined by how many bits each of the memory elements is storing. Further, for some example configurations, the mode in which each of the memory elements is configured may be dynamic. For example, a memory element may be programmed as a SLC and subsequently programmed as a MLC, or vice versa. For other example configurations, the modes may be static, in that a mode in which a memory element is configured or programmed may not change.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, multiple wordlines may span across a single string, and the number of FGTs in a string may be equal to the number of pages in a block.

Figure 3:
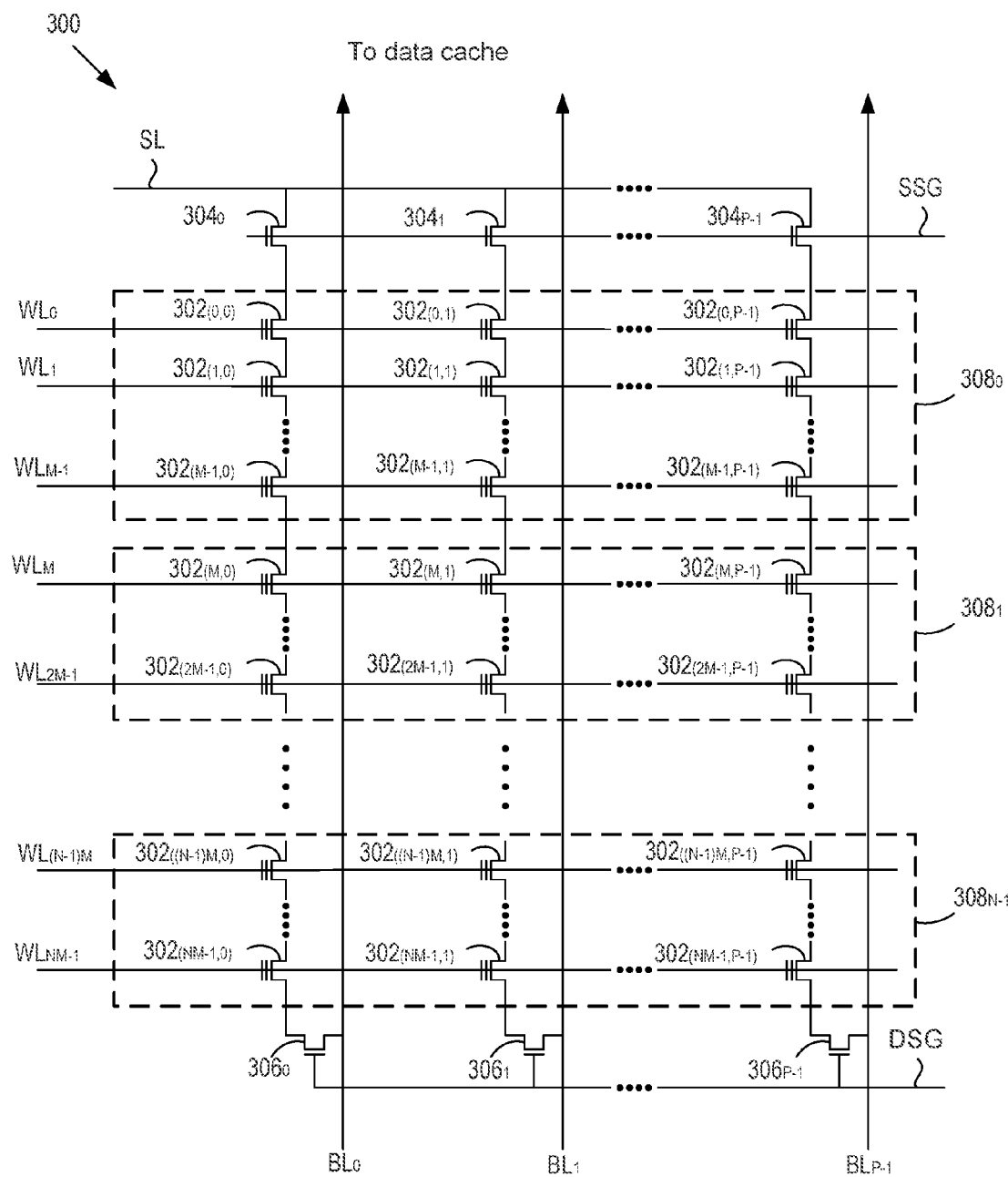
FIG. 3 is a circuit schematic diagram of an exemplary NAND-type flash memory array.

FIG. 3 is a circuit schematic diagram of at least a portion of an exemplary NAND-type flash memory array 300, which may be representative of at least a portion of the memory array 142. The memory array portion 300 may include a P-number of series-connected strings of (N times M) FGTs, each coupled to one of a P-number of bitlines $BL_1$ to $BL_{P-1}$, where N is the number of blocks $308_0$ to $308_{N-1}$ in the memory array 300, and M is the number of pages of FGTs coupled to wordlines WL in each of the N-number of blocks $308_0$ to $308_{N-1}$.

To sense data from the FGTs, a page of FGTs and a corresponding wordline may be selected, and current sensing of bitlines may be employed to determine whether a floating gate of a FGT in the selected page contains charge or not. Current that flows through a string may flow from a source line SL, through the string, to a bitline BL to which the string is coupled. The string may be coupled to the source line SL via a source select transistor, and may be coupled to its associated bitline BL via a drain select transistor. For example, a first string of FGTs $302_{(0,0)}$ to $302_{(NM-1,0)}$ may be coupled to the source line SL via a source select transistor $304_0$ that is connected to the source line SL, and may be coupled to its associated bitline $BL_0$ via a drain select transistor $306_0$. The other strings may be similarly coupled. Switching of source select transistors $304_0$, $304_1$, ..., $304_{P-1}$ may be controlled using a source select gate bias line SSG that supplies a source select gate bias voltage $V_{SSG}$ to turn on an off the source select transistors $304_0$, $304_1$, ..., $304_{P-1}$. Additionally, switching of drain select transistors $306_0$, $406_1$, ..., $306_{P-1}$ may be controlled using a drain select gate bias line DSG that supplies a drain select gate bias voltage $V_{DSG}$ to turn on and off the drain select transistors $306_0$, $306_1$, ..., $306_{P-1}$.

In addition, the memory array 142 and/or plurality of memory arrays 142 spanning multiple memory dies 104 may have an organizational arrangement or hierarchy under which memory elements or cells of the memory array 142 and/or multiple memory arrays 142 of multiple memory dies 104 are organized. The controller 102 may be configured to store and access data in accordance with the organizational arrangement or hierarchy.

Figure 4:
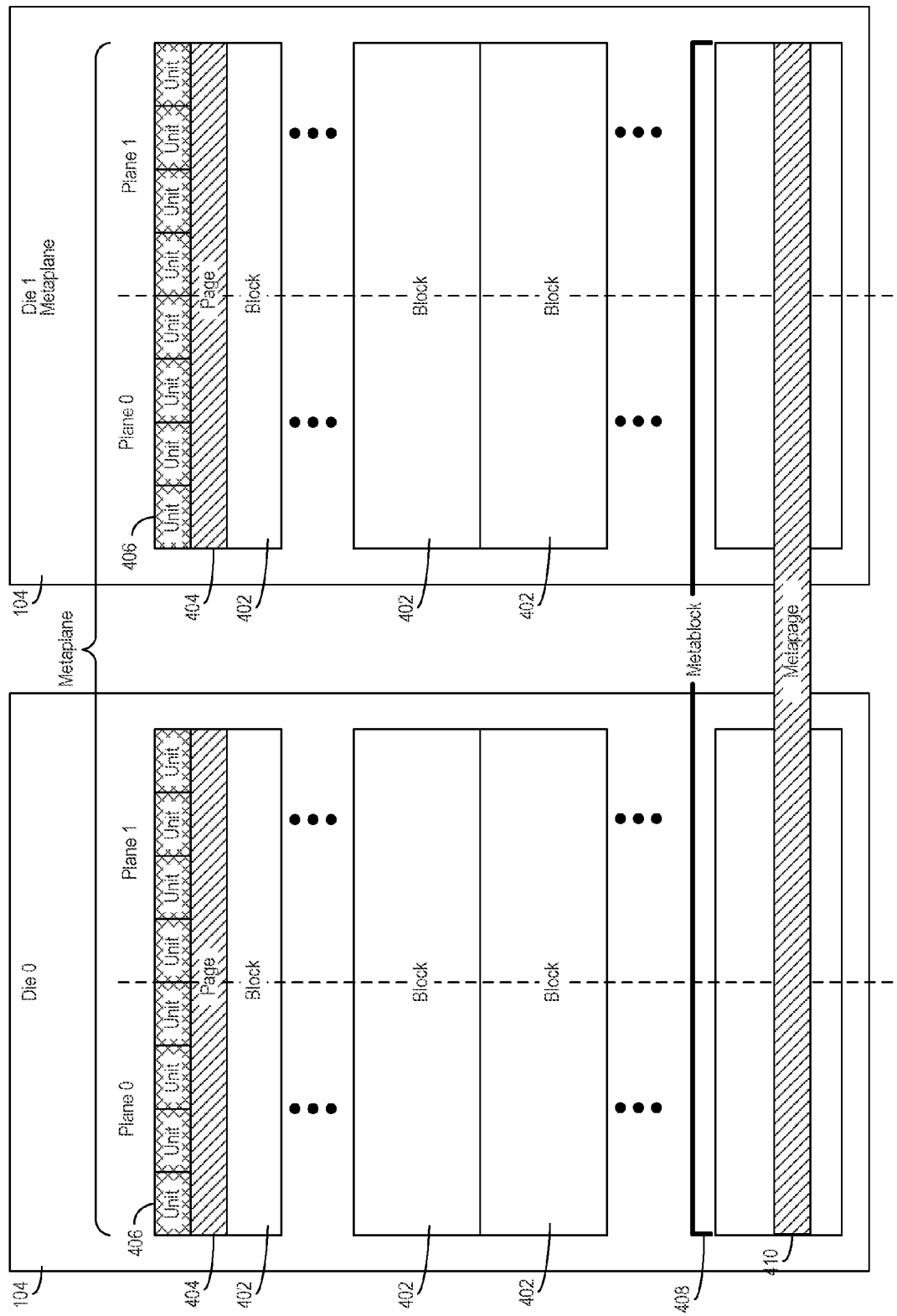
FIG. 4 is a block diagram of an example organizational arrangement or hierarchy of a memory array for flash memory.

Referring to FIG. 4, the memory array 142 and/or a plurality of memory arrays 142 spanning multiple memory dies 104 may have an organizational arrangement or hierarchy under which memory elements or cells of the memory array 142 and/or multiple memory arrays 142 of multiple memory dies 104 may be organized. The controller 102 may be configured to store and access data in accordance with the organizational arrangement or hierarchy.

FIG. 4 is a block diagram of an example organizational arrangement or hierarchy of a multi-die configuration that includes actual and abstract physical components. Actual physical components may include a plurality of memory arrays 142 (FIG. 2B), which may be organized or arranged into dies (or actual dies) 104, blocks (or actual blocks) 402, pages (or actual pages) 404, segments or units (or actual segments or units) 406, and planes (or actual planes).

The example arrangement shown in FIG. 4 is for two dies 104 including Die 0 and Die 1, although similar arrangements for more than two dies may be implemented. As mentioned, for flash memory, the memory cells may be divided or organized into blocks 402. As shown in FIG. 4, blocks 402 of a single die 104 may be arranged in a column. Additionally, each block 402 may further be divided into a number of pages 404. Each block 402 may contain the minimum number of memory elements that may be erased together. In addition, each page 404 may be a unit of sensing in the memory array 142. Each individual page 404 may further be divided into segments or units 406, with each segment or unit 406 containing a number of memory cells that may be written to at one time as a basic programming operation. Data stored in a segment or unit of memory cells—referred to as a flash memory unit (FMU), an ECC page, or a codeword may contain an amount of data that is written at one time during a basic programming operation and/or the amount of data that can be encoded or decoded by the ECC engine 124 during a single encoding or decoding operation. The pages 404 may be divided into the same number of segments or units. Example numbers of segments or unit may be four or eight, although other numbers are possible. In general, data may be stored in blocks and pages of memory elements non-contiguously (randomly) or contiguously.

In addition, the organizational arrangement or hierarchy may include a plurality of planes in which the blocks 402 may be configured. In the example arrangement shown in FIG. 4, each die 104 includes two planes, Plane 0 and Plane 1. In addition, in the example arrangement shown in FIG. 4, a single block 402 spans both planes in a single die 104. Data stored in different planes may be sensed simultaneously or independently.

Additionally, the organizational arrangement or hierarchy may include abstract components, including metablocks (or abstract blocks) 408, metapages (or abstract pages) 410, and metaplanes (or abstract planes). As used herein, a metablock 408 may span or be distributed across multiple blocks 402 of two or more dies 104, and similarly, a metapage 410 may span or be distributed across multiple pages 404 of two more dies 104. In the example arrangement in FIG. 4, the metablock 408 and the metapage 410 spans across both dies Die 0 and Die 1. Depending on the organizational arrangement, however, metablocks 408 and metapages 410 may span across three or more memory dies 104. Additionally, the plane across which a metablock spans may be referred to as a metaplane 412. In the example shown in FIG. 4, the metaplane 412 spans across Plane 0 and Plane 1 in both Die 0 and Die 1.

In other example arrangements, a block 402 may be identified as spanning only a single plane. For these other example arrangements, block 402 may include two blocks, one block spanning only Plane 0 and another block spanning only Plane 1, and metablocks 408 and metapages 410 may still span multiple blocks, but only within a single plane. However, for purposes of the present description, the memory dies 104 are described as being one-block in width, with metablocks 408 spanning multiple blocks 402 and also multiple dies 104.

In sum, the organizational arrangement for the memory dies 104 may include two sets of physical components—actual physical components and abstract physical components. The actual physical components and the abstract physical components may be mapped or correspond to each other. For example, a particular metablock 408 or metapage 410 may be mapped or correspond to a particular set of blocks 402 pages 404, respectively. As described in further detail below, the non-volatile memory system may implement two sets of addressing schemes, an actual addressing scheme and an abstract addressing scheme, to identify the actual and abstract components, and the abstract-to-actual address translation module 160 (FIG. 2A) may be used to provide the translation or mapping between the two physical addressing schemes. Also, as described in further detail below, the abstract physical components and addressing scheme may further be mapped or correspond to virtual physical components and host (logical) addresses.

Still referring to FIG. 4, the non-volatile memory system may employ an interleave scheme for writing data into the memory dies 104. The interleave scheme may determine, at least in part, sizes of the metablocks 408. In a particular example, the interleave scheme may include a die component (or die component number) and a plane component (or plane component number). The die component may identify the number of dies 104 over which the metablock 408 spans, and the plane component may identify the number of planes per die over which the metablock 408 spans. As non-limiting interleave scheme examples, a one-die, one-plane (1D 1P) interleave scheme specifies that a metablock 408 spans a single die in a single plane; a one-die, two-plane (1D 2P) interleave scheme specifies that a metablock 408 spans both planes in a single die; a two-die, two-plane (2D 2P) interleave scheme specifies that a metablock 408 spans two dies and both planes in each of the two dies; and a three-die, two-plane (3D 2P) interleave scheme specifies that a metablock 408 spans three dies and both planes in each of the three dies. Other interleave schemes, including those specifying that the metablocks span more than three dies, may be possible. A multi-die interleave scheme may indicate that the die component of the interleave scheme is greater than one.

As used herein, the die component of the interleave scheme may indicate the number of blocks 402 included in a metablock 408, or otherwise stated, may indicate the number of blocks 402 over which a metablock 408 spans. As examples, the 1D 2P interleave scheme indicates that a metablock 408 includes or spans one block 402; the 2D 2P interleave scheme indicates that a metablock 408 includes or spans two blocks 402; and the 3D 2P interleave scheme indicates that a metablock 408 includes or spans three blocks 402. Also, each block 402 may have an associated size in terms of bits or bytes, depending on the technology of the memory elements. A metablock size in terms of bits or bytes may be the number of blocks 402 over which the metablock 408 spans as indicated by the interleave scheme, multiplied by the number of bits or bytes in those blocks 402.

Referring back to FIG. 2B, the non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and selects a particular wordline in the memory array 142 when reading or writing data to/from the memory cells in the memory array 142. The column address decoder 150 may decode a column address and selects a particular group of bitlines in the memory array 142 to be electrically coupled to the data cache 144.

In addition, the non-volatile memory die 104 may include peripheral circuitry 150. The peripheral circuitry 150 may include a state machine 152 and volatile memory 154. The state machine 152 may be configured to provide status information to the controller 102. In addition, the state machine module 152 may receive commands or command sequences from the sequencer module 126 (via the memory interface 130) that instruct the state machine module 152 to read or write data. Also, the state machine module 152 may receive a reset (or power on reset (POR) command from the sequencer module 126 that instructs the state machine to access parameter sets and load them into the volatile memory 154 in order for the memory dies 104 to be initialized to perform memory functions. Other functionality of the state machine 152. Also, an example configuration of the volatile memory 154 may include latches, although other configurations are possible.

When the controller 102 writes data into the memory dies 104, the data may be written on the basis of the planes of the memory dies 104. For example, when data is to be stored in a block of a die, a first portion of the data to be stored in a first portion of the block associated with the first plane (e.g., Plane 0, (see FIG. 4)) may be loaded into a first portion of the data cache 144 associated with the first plane, and a second portion of the data to be stored in a second portion of the block associated with the second plane (e.g., Plane 1) may be loaded into second a portion of the data cache 144 associated with the second plane. After the data is loaded into the first and second portions of the data cache 144, the controller 102 may issue a program command (e.g., a multi-plane program command) to the non-volatile memory die 104, which in turn may cause the data loaded into the first and second portions of the data cache 144 to be stored in the respective portions of the block.

In addition, for a multi-die interleave scheme, the data may be loaded into the data cache 144 and then programmed into the memory array 142 on a die-by-die basis. For example, for a 2D 2P interleave scheme, data may be stored in a block of a first die and a block of a second die. The controller 102 may load data into data cache 144 of the first die and then issue a program command to the first die to have the data that was loaded into the cache 144 programmed into the block of the first die. Then, then after issuing the program command to the first die, the controller 102 may load data into data cache 144 of the second die and then issue a program command to the second die to have the data that was loaded into the cache 144 programmed into the block of the second die. Other ways of programming data into the non-volatile memory dies on the basis of blocks and dies may be possible.

Referring back to FIG. 2A, a host and the non-volatile memory system 100 may use different addressing schemes for managing the storage of data. For example, when a host wants to write data to the non-volatile memory system 100, the host may assign a host or logical address (also referred to as a logical block address (LBA)) to the data. Similarly, when the host wants to read data from the non-volatile memory system 100, the host may identify the data it wants read by the logical address. The host may utilize a host or logical addressing scheme in which a host file system maintains a logical address range for all LBAs assigned or recognized by the host. The logical addresses (LBAs) may be grouped into logical groups (LGs), which may further be divided or organized into units of logical sectors. For some examples, host read and write requests may be requests to read and write a segment comprising a string of logical sectors of data with contiguous addresses.

In contrast to the host's logical addressing scheme, the non-volatile memory system 100, as previously described, may store and access data according to one or more physical addressing schemes that use physical addresses different from the logical addresses assigned by the host to store and access data. To coordinate the host's logical addressing with the non-volatile memory system's physical addressing, the media management layer 138 may map logical addresses to physical addresses for storage or retrieval of data.

As previously described, the non-volatile memory system 100 may maintain two physical addressing schemes, an actual physical addressing scheme and an abstract physical addressing scheme. For some example configurations, the non-volatile memory system direct mappings between the host logical addresses and the abstract physical addresses (rather than the actual physical addresses) may be maintained, and the abstract-to-actual physical translation module 160 may be used to convert the abstract physical addresses to the actual physical addresses. In this way, logical groups and logical sectors of a logical group may be mapped or correspond to metablocks and physical sectors of a metablock.

FIG. 5 shows a schematic diagram of an example mapping between an i-th logical groups ($LG_i$) and a j-th metablock ($MB_j$). A logical group may have an M-number of logical group sectors, and a metablock may have an N-number of physical sectors. In some example configurations, M and N may be the same such that there is a one-to-one correspondence between the logical sectors and the physical sectors, and one metablock of storage may store one logical group of data. In other example configurations, N may be greater than M such that multiple logical groups may correspond to a single metablock and one metablock of storage may store two or more logical groups of data.

Additionally, in some instances, the logical sectors of data may be stored in the physical sectors of storage in contiguous and sequential logical order, while in other instances, N logical sectors of data may be stored randomly or discontiguously in the physical sectors of a metablock. In addition, in some instances where data is stored contiguously, there may be an offset between the lowest address of a logical group and the lowest address of the metablock to which it is mapped. In that case, logical sector addresses may wrap around as a loop from the bottom back to the top of the logical group within the metablock. For example, as shown in the bottom diagram of FIG. 5, and assuming M and N are the same, a metablock $MB_j$ may store data associated with a logical sector m in its first physical sector 0. When the last logical sector M−1 is reached, the logical sectors may wrap around such that the first logical sector 0 is stored contiguously and sequentially after logical sector 0, and the logical sector m−1 is stored in the last physical sector N−1. A page tag may be used to identify any offset, such as by identifying the starting logical sector address of the data stored in the first physical sector of the metablock.

FIG. 6 shows a block diagram of components of the non-volatile memory system 100 that may be used to determine actual physical addresses for executing host read and write commands. The components shown in FIG. 6 include the media management layer module 138, the abstract-to-actual physical address translation module 160, an address mapping database 162, and a free block list 164. The address mapping database 162 and the free block list 164 may be stored in the non-volatile memory dies 104, the RAM 116, or a combination thereof. For example, some portions of the mapping database 162 and/or the free block list 164 may be stored in the non-volatile memory dies 104 while other portions may be stored in the RAM 116. The portions may be stored in different locations of the non-volatile memory dies 104 and/or the RAM 116 at the same time or at different times during operation of the non-volatile memory system 104. In addition or alternatively, copies or different versions of the portions may be created and stored, permanently or temporarily, in the non-volatile memory dies 104 and/or the RAM 116. Various configurations for storing the address mapping database 162 and the free block list 164 may be possible.

In order to keep track of where in the non-volatile memory system 100 data is stored, the non-volatile memory system 100 may maintain and manage a directory system or address mapping database 162 that maps relationships or associations between logical addresses and metablock addresses. The address mapping database 162 may include one or more address data structures (such as tables, listings, logs, or databases as examples) that track and identify the logical-physical address relationships or mappings.

The address mapping database 162 may be configured in various ways to track or identify where data is stored. For example, the address mapping database 162 may include a primary address data structure (also referred to as a Group Address Table (GAT)) that provides a primary logical-physical address mapping for logical addresses included in the logical address range recognized by the host system 101. Various configurations of the mapping for the GAT are possible. In one example configuration for flash technology, the GAT keeps track of logical-physical address mapping between logical groups of logical sectors and corresponding metablocks. The GAT includes an entry for each logical group, ordered sequentially according to logical addresses.

In addition, the GAT may be organized into a plurality of GAT pages, with each GAT page including entries identifying a metablock address for every logical group. For some example configurations, the address data structures 162 may include at least one secondary address data structure in addition to the GAT. The at least one secondary address data structure may provide logical-physical address mapping for data fragments, may track changes or updates to where data is stored, or some combination thereof. One example secondary address data structure, referred to as GAT Delta, may track changes to entries and/or include a listing of changed entries in the mappings of the GAT. When data is re-written, the new version of the data may be written to another part of the non-volatile memory system 100, such as in an update block. GAT Delta may map data stored in the update blocks with associated logical groups. Other secondary address data structures may be possible.

A host read command from a host that is received by the non-volatile memory system 100 may identify a data set to be read by identifying host address information, for example one or more logical groups, that identifies from the host's perspective where the data set is being stored in the non-volatile memory dies 104. Upon receipt of the host read command, the media management layer module 138 may be configured to access the address mapping database 162 to obtain abstract physical address information (e.g., a metablock address) that maps to the host address information identified in the host read command.

When the media management layer module 138 obtains the abstract physical address, it may pass the abstract physical address to the abstract-to-actual physical address translation module 160. The abstract-to-actual physical address translation module 160 may then translate or convert the abstract physical address to an actual physical address. The actual physical address may identify particular actual components of the multi-die arrangement of the memory dies 104 where the data set is stored, such as one or more particular memory dies 104, along with one or more blocks, one or more pages, and one or more columns within the one or more particular memory dies 104.

When the abstract-to-actual physical address translation module 160 determines the actual physical address, it may pass the actual physical address to the sequencer module 126 (FIG. 2A). In turn, the sequencer module 126 may generate one or more read context commands using the actual physical address information, and send the one or more read context commands to the appropriate memory dies 104 as indicated by the actual physical address information. Transmission of the read context commands to the memory dies 104 may cause the memory dies 104 storing the data set to load the data set (or a copy of the data set) into the RAM 116 (or some other temporary storage area that is accessible by the controller 102). Example read context commands may include sense commands to have the data set sensed into data cache 144 (FIG. 2B), and data transfer commands to have the sensed data set transferred to the RAM 116. When the data set is loaded into the RAM 116, the controller 102 may then transmit the data set back to the host to complete execution of the host read command. Other actions, such as error correction using the ECC engine 124, may be performed in between the data set being loaded into the RAM 116 and being transferred back to the host system.

In addition to the address mapping database 162, the non-volatile memory system 100 may also maintain and manage a free block list (FBL) 164 that identifies physical locations in the memory dies 104 that are available for storage of data (e.g., for allocation as an updated block). In an example implementation, the free block list 164 may identify metablocks that are available for storage of data. A host write command from a host may identify or include a data set that the host system wants written into the memory dies 104. When the non-volatile memory system 100 receives the host write command, the media management layer module 138 may be configured to select from the free block list 164 one or more physical locations (e.g., metablocks) in which to write the data set.

The non-volatile memory system 104 may be configured to write data into the non-volatile memory dies 104 in accordance with a wear leveling scheme. In general, the health of a memory cell or its ability to reliably retain data may correspond to how often data has been programmed or written into it. So that the health or wear of the memory dies 104 is generally even across the dies 104, the wear leveling scheme may aim for data to be written into the actual blocks of the memory dies 104 in as evenly distributed of a manner as possible during the life or course of operation of the non-volatile memory system 100.

One way to implement wear leveling is to have the metablocks be evenly associated with or distributed into a plurality of metablock groups, and to select the metablocks from the metablock groups in an evenly distributed manner. For example, if the media management layer module 138 selects a metablock from one metablock group in which to write a first data set, then when the media management layer module 138 determines to select another or next metablock in which to write another or next data set, the media management layer module 138 may select an available metablock from a metablock group that is different than the prior metablock group. In general, in order to ensure that data sets are written into the memory dies 104 in as evenly distributed of a manner as possible, when the media management layer module 138 has selected a metablock from a metablock group, the media management layer module 128 may not return to that metablock group to select another metablock until it has selected a metablock from each of the other metablock groups. The free block list 164 may indicate, or the media management layer module 138 may otherwise be able to determine, the associations between the available metablocks and their associated metablock groups in order to make metablock selections from the free block list 164 in accordance with the wear leveling scheme.

In some example configurations, the metablocks may be distributed into or associated with metablock groups on a metaplane basis. That is, metablock groups may correspond to metaplanes and metablocks of the same metaplane may be in the same metablock group. Assuming that the same number of the dies 104 are included in each of the metaplanes and each die 104 has the same number of blocks, then the metablocks may be evenly distributed or distributed into the plurality of metablock groups.

Multi-die memory systems 100 that employ a multi-die interleave scheme where a total number of the dies 104 is a multiple of the die component number of the employed interleave scheme may be compatible with or suitable for evenly distributing or associating metablocks with metablock groups on a metaplane basis since the dies 104 may be evenly divided into or arranged in the metaplanes. For example, an eight die multi-die configuration and a 2D 2P interleave scheme may yield four metaplanes with each of the four metaplanes spanning two dies, and with none of the dies 104 being left out from being spanned by a metaplane. As a result, metablocks of the same metaplane may be associated with the same metablock group. Assuming that the dies 104 each include the same number of blocks, then metablocks may be evenly distributed in the metablock groups in that the metablock groups may be associated with the same number of metablocks.

However, if the total number of dies 104 is not a multiple of the die component of the multi-die interleave scheme, then the dies 104 may not be evenly divided into metaplanes. As a result, metablocks may not be evenly distributed in or associated with metablock groups on a metaplane basis.

The present description describes physical address management for a multi-die non-volatile memory system 100 that implements a multi-die interleave scheme, where the total number of actual dies 104 is a non-multiple of the die component number of the multi-die interleave scheme. Despite the total number of dies 104 being a non-multiple of the die component number, the memory system 100 may nonetheless distribute or associate metablocks with metablock groups on a metaplane basis. However, instead of the metaplanes being determined by virtual dies of a virtual die layout.

In further detail, the media management layer module 138 may utilize a virtual die layout that is different than an actual die layout of the non-volatile memory system 100. The virtual die layout may be identify a different number of virtual dies than the number of actual dies. In particular, the total number of virtual dies may be a multiple of the die component number of the interleave scheme. In some example configurations, the number of virtual dies may be less than the number of actual dies, although in other example configurations, the number of virtual dies may be increased. Also, the number of virtual blocks in each of the dies may be proportionately increased or decreased according to the increase or decrease in the number of virtual dies so that the total number of virtual blocks is the same as the total number of actual blocks. In particular, the number of virtual blocks in a virtual die may be set to the number of actual blocks in an actual die multiplied by the ratio of the total number of actual dies to the total number of virtual dies.

The metaplanes, including the total number of metaplanes, may be based on the die component number of the interleave scheme and the virtual dies, rather than the actual dies. In particular, the number of metaplanes may be the total number of virtual dies divided by the die component number. By setting the total number of virtual dies to be a multiple of the die component number and setting the number of metaplanes based on the number of virtual dies, the virtual dies may be evenly divided into the metaplanes without any virtual dies being left out from being spanned by a metaplane.

In addition, the metablocks may be mapped to the virtual blocks. With respect to wear leveling, the metablock groups may correspond to the metaplanes, such that the metablocks of the same metaplane may be part of the same metablock group. In turn, virtual blocks of the same virtual die may be part of the same metablock group. In this way, by determining the metaplanes based on the virtual dies and mapping the metablocks to the virtual blocks, the metablocks may be evenly distributed into and/or associated with the metablock groups on a metaplane basis.

Through utilization of an actual die layout and a virtual die layout, each metablock may be associated with a plurality of actual blocks and a plurality of virtual blocks. Since the virtual die layout is different than the actual die layout i.e., the number of virtual dies being different than the number of actual dies and the number of actual blocks per die being different than the number of virtual blocks per die for one or more of the metablocks, at least one of the actual blocks associated with a metablock may be different than at least one of the virtual blocks also associated with that metablock.

One way actual and virtual blocks may be identified as being different is by having different block identifications or addresses. For example, an identification or address of an actual block may include a die number or other indicator that identifies the actual die in which the actual block is located and a block number or other indicator that identifies which number block (e.g., first, second, third, etc.) it is in the actual die. In some examples, the die number and block number may be considered in combination as an actual die number and block number pair. A metablock address of a metablock spanning multiple actual blocks may be mapped to a set of actual die number and block number pairs. Similarly, an identification or address of a virtual block may include a block number or other indicator that identifies the virtual die in which the virtual block is located and a block number or other indicator that identifies which number block (e.g., first, second, third, etc.) it is in the virtual die. Two blocks (actual or virtual) may be different from each other if one or both of their respective die numbers or block numbers are different. In some examples, the die number and block number may be considered in combination as a virtual die number and block number pair. A metablock address of a metablock spanning multiple virtual blocks may be mapped to a set of virtual die number and block number pairs.

In addition, when the total number of actual dies 104 is a multiple of the die component of the multi-die interleave scheme, the actual blocks that a metablock includes may all be in the same row of blocks across the memory dies 104. Accordingly, when data is written into or read from a metablock, the actual blocks in which the data is written into or read from may all be in the same row of actual blocks.

However, if the total number of dies 104 is not a multiple of the die component of the multi-die interleave scheme, then the dies 104 may not be evenly divided into metaplases, and all of the actual blocks of a metablock may not be able to be in the same row of blocks. As such, an abstract-to-actual mapping that maps or associates metablocks and their associated metablock addresses with actual blocks and their associated actual block addresses, and that is different from one employed when the number of actual dies is a multiple of the die component of the multi-die interleave scheme, may be determined.

Figure 7:
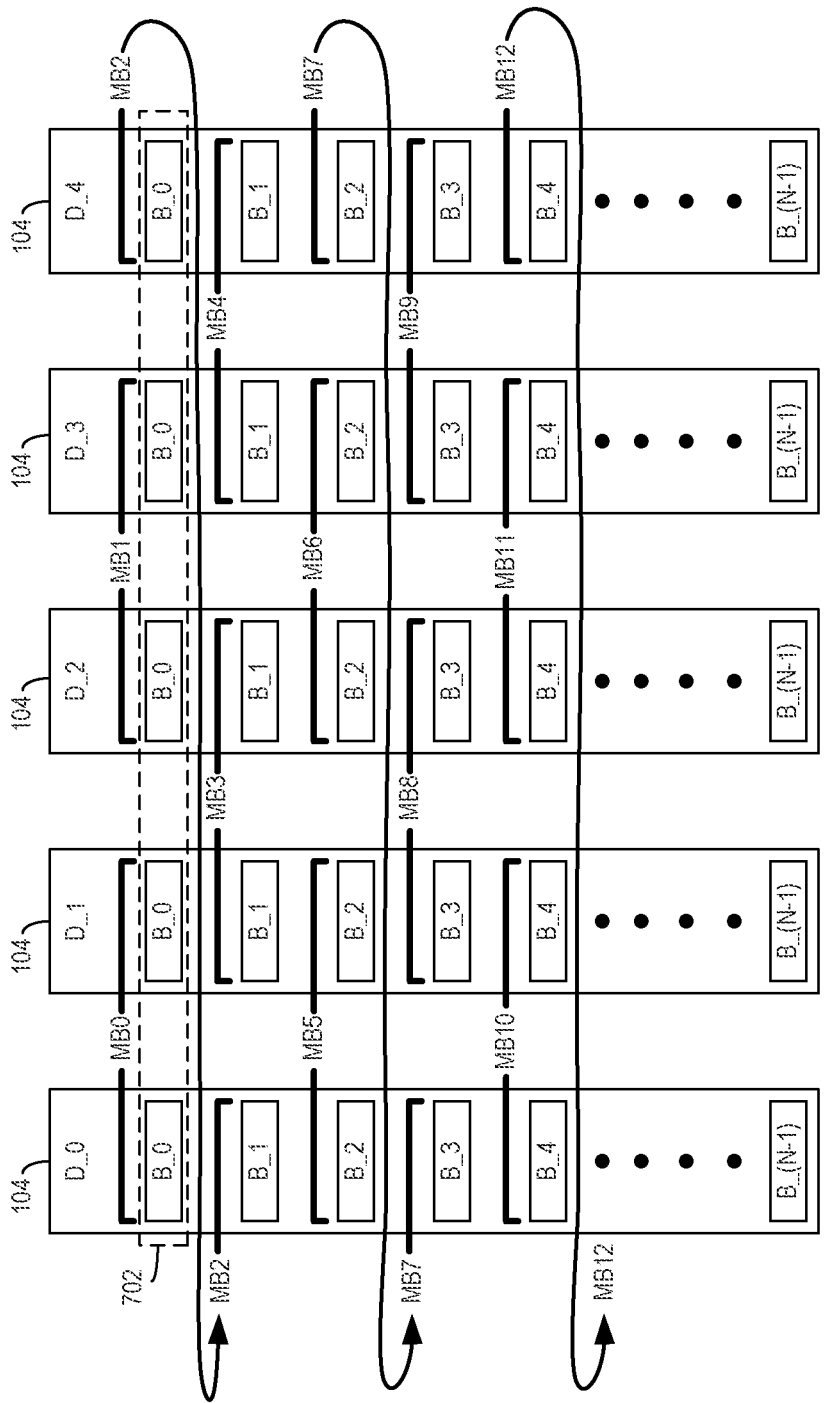
FIG. 7 is a schematic diagram of an example actual die layout with actual blocks mapped to metablocks.

FIG. 7 shows a schematic diagram of an example actual die layout with actual blocks mapped to metablocks for a multi-die configuration where the total number of dies 104 is a non-multiple of the die component number of a multi-die interleave scheme. In the example actual die layout shown in FIG. 6, the total number of dies 104 includes five actual dies 104, including a first die D_0, a second die D_1, a third die D_2, a fourth die D_3, and a fifth die D_4. Each of the memory dies 104 may include an N-number of actual blocks arranged in a column. Each actual block in a die 104 may have a corresponding block number, which may be indicative of the block's position with the column, referred to as a column position. Accordingly, the N-number of blocks in each die 104 as shown in FIG. 7 may include a first block B_0, a second block B_1, a third block B_2, a fourth block B_3, a fifth block B_4, and extend in the column to a last block B_(N−1). Actual blocks that are located in different dies but have the same block number or column position in their respective dies may be part of a same row 702 of blocks.

In the example shown in FIG. 7, a 2D 2P interleave scheme is implemented for the 5-die configuration. As such, each metablock may span or include two actual blocks. In the example metablock-to-actual block mapping shown in FIG. 7, metablocks may be mapped to blocks on a row-by-row basis. However, because the total number of dies 104 (i.e., 5) is a non-multiple of the die component of the multi-die interleave scheme (i.e., 2), then in at least some of the rows, a metablock may be mapped to a number of blocks in a row that is less than the total number of blocks it is to be mapped to.

To illustrate, in FIG. 7, each metablock address may be mapped to two blocks since a two-die, two-plane (2D 2P) interleave scheme is employed. Starting with the first row blocks (i.e., the row including blocks numbered B_0), a first metablock address MB0 may be mapped to the first block B_0 of the first die D_0 and the first block B_0 of the second die D_1. Similarly, a second metablock address MB1 may be mapped to the first block BO of the third die D 2 and the first block B_0 of the fourth die D_3. The third metablock address MB_2 may be mapped to the first block B_0 of the fifth die D_4. However, because there are five dies, only one actual block in the first row may be mapped to the last metablock mapped to blocks in the first row. As such, additional actual blocks need to be mapped to the last metablock of the first row of blocks.

For the example mapping shown in FIG. 7, in the event that a metablock is mapped to a number of actual blocks in a row that is less than the total number blocks the metablock is to be mapped to, a P-number of remaining blocks to be mapped to that metablock address may be the first P-number of blocks in the next or adjacent row of blocks. To illustrate in FIG. 6, since the third metablock MB2 is mapped to only one block in the first row, then there is one remaining block for the third metablock MB2 to be mapped to. That one remaining block may be the first block in the next (second) row, which is second block B_1 of the first die D_0. The mapping between metablocks and actual blocks may proceed in this manner until all of the blocks are mapped to a metablock address.

Figure 8:
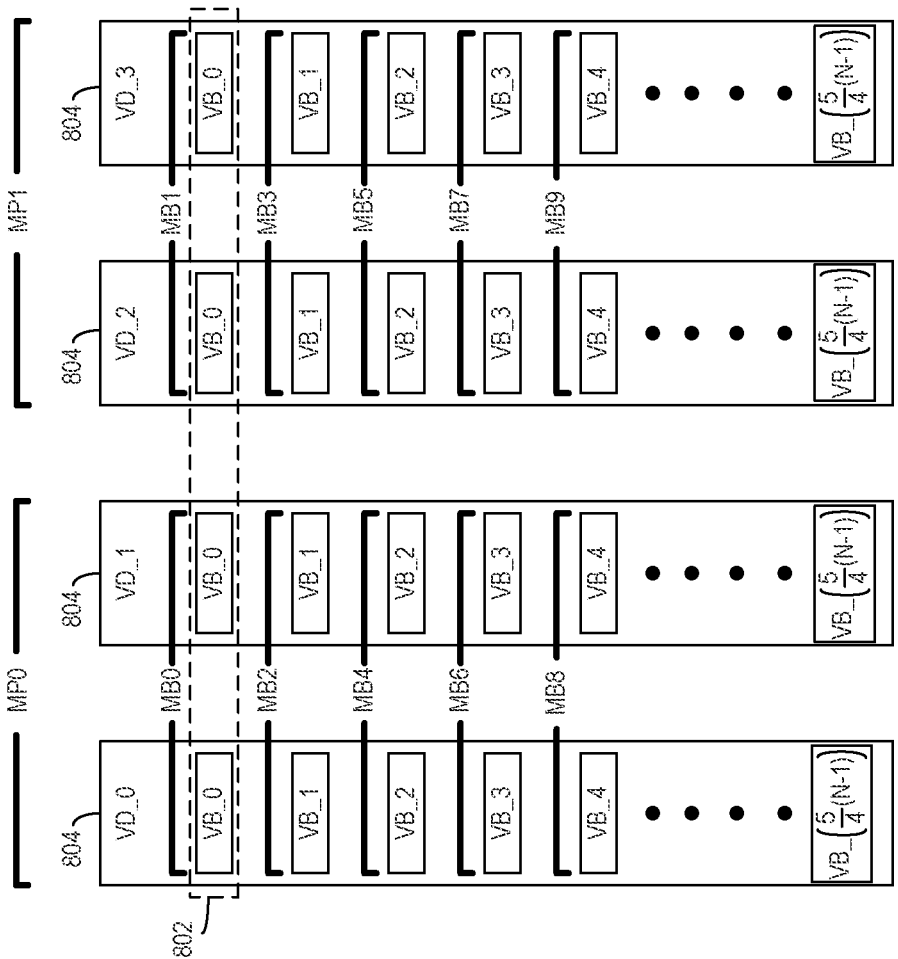
FIG. 8 is a schematic diagram of an example virtual die layout corresponding to the example actual die layout of FIG. 7.

A virtual die layout, including the number of virtual dies (VD) and the number of virtual block (VB) in each of the virtual dies may be generated based on the actual die layout of the memory system 100. FIG. 8 shows a schematic diagram of an example virtual die layout based on the example actual die layout of FIG. 7. In the example virtual die layout of FIG. 8, the total number of virtual dies 804 is different than the total number of actual dies 104. In particular, the virtual die layout includes four virtual dies 804, including a first virtual die VD_0, a second virtual die VD_1, a third virtual die VD_2, and a fourth virtual die VD_3. In addition, the total number of virtual dies 804 is a multiple of the die component number of the multi-die interleave scheme—i.e., four is a multiple of two. To generalize, the total number of virtual dies may be set to the die component number multiplied by a quotient of the total number of the plurality of actual dies 104 divided by the die component number. The quotient may alternatively be considered a floor of the division in that the result of the division of the total number of actual dies 104 and the die component number may be rounded down to the nearest integer. Accordingly, in view of FIGS. 7 and 8, the total number of actual dies 104 is 5, divided by the die component number 2, yields a quotient of 2, multiplied by the die component number 2, which yields a total number of virtual dies to be 4. In addition or alternatively, if possible, depending on the number of actual dies and the die component number, a total number of virtual dies 804 may be set to a number such that the log base 2 of that total number is an integer. In contrast, the log base 2 of the total number of actual dies 104 may be a non-integer. For example, with respect to FIGS. 7 and 8, the log base 2 of the four virtual dies 804 is an integer (i.e., two), whereas the log base 2 of the five actual dies 104 is a non-integer.

When the number of virtual dies is determined 804, the number of virtual blocks VB for each of the virtual dies 804 may be determined. As previously described, the number of virtual blocks VB in each of the virtual dies 804 may be proportionately increased or decreased according to the increase or decrease in the number of virtual dies so that the total number of virtual blocks VB is the same as the total number of actual blocks. In particular, the number of virtual blocks in a virtual die may be set to the number of actual blocks in an actual die multiplied by the ratio of the total number of actual dies to the total number of virtual dies. For the actual and virtual die layouts of FIGS. 7 and 8, the number of virtual blocks VB in each virtual die may be 5/4 times the N-number of actual blocks, which is denoted in FIG. 8 by identifying the last virtual block in each of the virtual dies as "VB_(5/4(N−1))." By proportionately increasing or decreasing the number of virtual blocks, the number of virtual blocks may be the same as the number of actual blocks.

Also, the metaplanes may be determined based on the virtual dies 804 of the virtual die layout and the die component number of the interleave scheme. In the example virtual die layout of FIG. 8, there are two metaplanes, a first metaplane MP0 and a second metaplane MP1, with each metaplane spanning and/or being associated with two of the four virtual dies 804. For example, the first metaplane MP0 spans or is associated with the first and second virtual dies VD_0, VD_1, and the second metaplane MP1 spans or is associated with the third and fourth virtual dies VD_2, VD_3.

For purposes of wear leveling, when mapping the metablocks to the virtual blocks, the metablocks may be evenly associated with or distributed into metablock groups on a metaplane basis. For example, all of the metablocks in the first metaplane MP0 may be part of a first metablock group, and all of the metablocks in the second metaplane MP1 may be part of the second metablock group. Assuming that each of the virtual dies 804 have the same number of virtual blocks, then the same number of metablocks may be in each of the metaplane groups, resulting in the metablocks being evenly distributed in the two metablock groups on the basis of which metaplane they are located in and/or associated with.

In addition, the metablocks may each be mapped to the same number of virtual blocks VB as the number of actual blocks. For example, as shown in FIG. 8 for a 2D 2P interleave scheme, each metablock is mapped to or includes two virtual blocks. In addition, like the abstract-to-physical mapping of FIG. 7, the abstract-to-virtual mapping may performed be on a row-by-row basis. For example, a first metablock MB0 may be mapped to a first virtual block VB_0 of the first virtual die VD_0 and the first virtual block VB 0 of the second virtual die VD_1, the second metablock MB1 may be mapped to the first virtual block V_0 of the third virtual die VD_2 and the first virtual block VB_0 of the fourth virtual die VD_3. In addition, in contrast to the actual die layout, because the number of virtual dies is a multiple of the die component number, then for each of the metablocks, all of the virtual blocks mapped to a metablock may be in the same row of metablocks. Accordingly, the third metablock MB2 may be mapped to the second virtual blocks VB_1 of the first and second virtual dies VD_0, VD_1 in the second row of virtual blocks. In other words, there is no overlap in rows of blocks when mapping the metablocks to the virtual blocks, in contrast to the actual die layout of FIG. 7, as a result of the total number of virtual dies 804 being a multiple of the die component number of the multi-die interleave scheme.

Accordingly, in view of FIGS. 7 and 8, each metablock and associated metablock address may be mapped to a set of actual blocks and associated set of actual die and block number pairs and may also be mapped to a set of virtual blocks and associated set of virtual die number and block number pairs. Because the total number of virtual blocks is different than the total number of actual blocks, then for at least some of the metablocks, the associated set of actual die number and block number pairs may be different than the associated set of virtual die number and block number pairs. Sets may be different if at least one pair from each set has a different die number, a different block number or both. However, for some of the metablocks, all of the associated sets of die number and block number pairs may be the same. For example, the actual set of die number and block number pairs associated with the first metablock MB0 is (D_0, B_0) and (D_1, B_0), which has the same die and block numbers as the associated virtual set of die number and block number pairs, which is (VD_0, VB_0) and (VD_1, B_0). However, and actual and virtual sets associated with the third metablock MB2 are different between each other. For example, the actual set of die number and block number pairs associated with the third metablock MB2 is (D_4, B_0) and (D_0, B_1), whereas the associated virtual set of die number and block number pairs is (VD_0, VB_1) and (VD_1, VB_1).

Referring back to FIG. 6, when a host write command to write a data set is received by the non-volatile memory system 100, the media management layer module 138 may select metablocks in accordance with the wear leveling scheme as previously described. To do so, the media management layer module 138 may access the free block list 164, which may identify (or the media management layer module 138 may be otherwise configured to determine) the associated metablock groups with which each of the metablocks is associated with, which may correspond to the metaplanes determined from the virtual die layout. In this sense, the media management layer module 138 may utilize the virtual die layout, rather than the actual die layout, when selecting available metablocks according to the wear leveling scheme. From the perspective of the media management layer module 138, the virtual die layout is the actual die layout of the memory system 100. For example, with reference to the actual and virtual die layouts of FIGS. 7 and 8, the media management layer module 138 may operate under the assumption that there are four dies and two metaplanes when selecting available metablocks. In addition, the media management layer module 138 may manage or update entries in the address mapping database by linking or mapping the metablocks it selects from the free block list 164 with the logical (host) address information provided from the host with the host write command.

After the media management layer module 138 selects an available metablock from the free block list 164, the media management layer module 138 may send the associated metablock address (e.g., metablock number) to the abstract-to-actual physical address translation module 160. The abstract-to-actual physical address translation module 160 may configured to know the abstract-to-actual mapping between the metablocks and the actual blocks, such as that implemented for the actual die layout of FIG. 7. By knowing the mapping, the abstract-to-actual physical address translation module 160 may be configured to convert or translate the metablock address (number) provided from the media management layer module 138 to an actual physical addresses identifying the actual blocks where the data set is to be written. In some example configurations, at least part of the translation may convert the metablock address to an actual set of die number and block number pairs. For the abstract-to-actual mapping shown in FIG. 7, the abstract-to-actual physical address translation module 160 may be configured to utilize the following equations to determine an actual set of die number and block number pairs for a received metablock number:

$$\text{Die}(n)_{MB} = \text{mod}((\text{mod}(\text{MBadd}, D) * L) + n - 1, D), \quad (1)$$

$$\text{Block}(n)_{MB} = \text{quotient}\left[\frac{(\text{mod}(MBadd, D) * L) + n - 1}{D}\right] \quad (2)$$

where $\text{Die}(n)_{MB}$ represents an n-th die number of an n-th actual block of the metablock, $\text{Block}(n)_{MB}$ represents an n-th block number of the n-th actual block of the metablock, n is an integer corresponding to the n-th ordinal number, MBadd represents a metablock address (e.g., number) of the metablock, D represents the total number of actual dies of the non-volatile memory, and L represents a die component number of a multi-die interleave scheme for the non-volatile memory system. In addition, "mod" denotes a modulo function, where mod(X,Y) is equal to the remainder of X divided Y. The abstract-to-actual physical address translation module 160 may be configured to know certain parameters, such as the total number of actual dies and the die component number of the interleave scheme in order to implement equations (1) and (2).

As an illustration, using the actual die layout of FIG. 7 as an example, the abstract-to-actual physical address translation module 160 may know (e.g., be programmed) to identify D as being 5 and L as being 2. Suppose, for example, that the media management layer module 138 provides an eighth metablock address MB8 to the abstract-to-actual physical address translation module 160. The abstract-to-actual physical address translation module 160 may set Mbadd to 7, and then utilize equation (1) to determine a first actual die number and equation (2) to determine a first actual block number (together a first actual die number and block number pair) by setting n to 1. Upon utilizing equations (1) and (2), the abstract-to-actual physical address translation module 160 may identify the first actual block and die number pair to be (D_4, B_2). After or in addition to determining the first pair, the abstract-to-actual physical address translation module 160, knowing that there are two pairs in the set to be determined, may again utilize equation (1) to determine a second actual die number and equation (2) to determine a second actual block number (together a second actual die number and block number pair) by setting n to equal 2. Upon utilizing equations (1) and (2), the abstract-to-actual physical address translation module 160 may identify the second actual block and die number pair to be (D_0, B_3). Equations (1) and (2) may be similarly or generally implemented for other numbers of total actual dies and/or multi-die interleave schemes other than 2D 2P.

After determining the set of actual die and block number pairs, the abstract-to-actual physical address translation module 160 may provide that actual physical address information to the sequencer module 126 (FIG. 2A). In turn, the sequencer module 126 may utilize that information to generate write context commands to write the data set into the actual dies identified by and/or corresponding to the actual sets of die number and block number pairs.

Similarly, when the memory system 100 receives a host read command to read a data set, the media management layer module 138 may be configured to access the address mapping database with logical (host) address information identified in the host read command to obtain associated metablock address information (e.g., a metablock number). The media management layer module 138 may then send the metablock address information to the abstract-to-actual physical address translation module 160, which in turn may convert or translate the metablock address information to a set of actual die number and block number pairs, such as by utilizing equations (1) and (2) above. The abstract-to-actual physical address translation module 160 may then send the actual address information to the sequencer module (FIG. 2A), which in turn may generate one or more read context commands to read the data set.

Additionally, while the actual and virtual die layouts are shown for a five-die actual die configuration, an associated four-die virtual die configuration, and a 2D 2P multi-die interleave scheme, the above features may be implemented for any other numbers of actual dies and die component numbers, where the total number of actual dies is a non-multiple of the die component number of the interleave scheme.

In sum, utilization of a virtual die layout may allow for metablocks to be evenly distributed in and/or associated with metablock groups on a metaplane basis for multi-die configurations where the number of actual dies is a non-multiple of a die component number of a multi-die interleave scheme. As a result, the media management layer module 138 may select metablocks in accordance with a wear leveling scheme without the metablocks having to be evenly distributed into metablock groups based on a criteria other than or different from which metaplane the metablocks are associated with. Utilization of such a virtual die layout, in conjunction with an abstract-to-actual physical address translation module that accounts for the total number of actual dies being a non-multiple of the die component number of the multi-die interleave scheme, may be a more straightforward and/or cost-effective approach to handling address management and translation for such multi-die configurations compared to other configurations that may associate the metablocks with metablock groups and on a basis other than a metaplane basis.

Still referring to FIG. 6, in another aspect of the non-volatile memory system 100, an initialization module 161 of the controller 102, such as through use of RAM 116, the ROM 118 (FIG. 2A), execution of code stored in the RAM 116 and/or the ROM 118, and/or the loading of information stored in the non-volatile memory dies 104 and loaded into the RAM 116 as examples, may perform an initialization process to initialize the non-volatile memory system 100 for communication with the host system, handle commands received from the host system, or otherwise configure itself to perform its memory management operations. During the initialization process, the initialization module 161 may be configured to initialize one or more memory dies, such as by sending an initialization or power on reset (POR) command to the memory dies.

In addition, during the initialization process, the initialization module 161 may be configured to determine the virtual die layout by accessing virtual die layout information 163 identifying the features of the virtual die layout in the non-volatile memory dies 104 and loading the virtual die layout information 163 into the RAM 116. In some example configurations, the virtual die layout 163 may be part of firmware stored in the non-volatile memory dies 104 and loaded into the RAM 116 during initialization, although other configurations may be possible. With the virtual die layout information 163 loaded into the RAM 116, the initialization module 161 may be configured to generate mapping between metablock addresses (numbers) and metablocks corresponding to the virtual die layout.

In addition to loading the virtual die layout information 163 into the RAM 116, the initialization module 161 may load configuration files 165 stored in the non-volatile memory dies 104 into the RAM 116. The configuration files 165 may identify the multi-die interleave scheme, among other features or operating parameters of the controller 102, such as a bad block list identifying which blocks are unusable, whether to enable wear leveling, whether to enable ECC, whether to enable on-chip or off-chip copying, what types of garbage collection or other background operations to perform and/or capacities at which to perform them, folding parameters, delay parameters between commands being issued, and dynamic read voltage levels, as non-limiting examples.

Additionally, the initialization module 161 may be configured to locate the address mapping database 162 and the free block list 164 in the non-volatile memory dies 104 and load at least a portion of them in the RAM 116. For some example configurations, the media management layer module 138 may learn or determine the virtual die layout and metablocks and their associated metablock addresses (numbers) from the addressing mapping database 162 (e.g., GAT pages of the address mapping database 162) and/or the free block list 164 upon the database 162 and the free block list 164 being loaded into the RAM 116. In addition or alternatively, the media management layer module 138 may learn or determine the virtual die layout and metablocks and their associated metablock addresses (numbers) upon the virtual die layout information 163 being loaded into the RAM 116. Various other ways that the media management layer module 138 learns or determines the virtual die layout and the metablocks and associated metablock addresses may be possible.

As mentioned, in order to perform the initialization process (or at least start the initialization process), the initialization module 161 may be configured to access the address mapping database 162, the free block list 164, the virtual die layout information 163, and configuration files 165, as well as other initialization information, such as boot code (e.g., boot blocks and boot pages, firmware, file system maps, etc.) stored in the non-volatile memory dies 104. In some situations, the initialization module 161 may be configured to utilize the virtual die layout rather than the actual die layout in order to determine where certain initialization data is stored in the non-volatile memory dies 104. A particular situation may be where the virtual die layout corresponds to another (e.g., an older) actual die layout and the code stored in the RAM 116 and/or the ROM 118 to access the initialization data may not be revised or updated to recognize the actual die layout. For these situations, it may be desirable, in order to avoid ROM spin, to store the initialization data in actual blocks of actual dies that have matching virtual dies, and where those matching virtual dies are part of the same metaplane. To illustrate using the example actual and virtual die layouts of FIGS. 7 and 8, the first and second virtual dies VD_0 and VD_1 are in the same, first metaplane MP0, and the third and fourth virtual dies VD 2 and VD_3 are in the same, second metaplane MP1. The matching actual dies are accordingly the first and second actual dies D_0 and D 1 and the third and fourth actual dies D_2 and D3, with the fifth actual die D_4 not being matched to any virtual die. Also, since virtual dies VD_0 and VD 1 are in the same metaplane MP0 and virtual dies VD_2 and VD_3 are in the same metaplane MP0, then the initialization data may be stored in actual blocks of the first and second actual dies D_0 and D_1, or in actual blocks of the third and fourth actual dies D_2, D_3. In view of the actual die layout of FIG. 7, example actual block pairs may include those corresponding to (D_0, B_0) and (D_1, B_0) (associated with MB0); (D_2, B_0) and (D_3, B_0) (associated with MB1); (D_0, B_2) and (D_1, B_2) (associated with MB1, and so on. Conversely, example actual block pairs in which the initialization data may not be stored may include those corresponding to (D_4, B_0) and (D_0, B_1) (associated with MB2); (D_1, B_1) and (D2, B_1) (associated with MB3); (D_3, B_1) and (D_4, B_1) (associated with MB4), and so on.

Figure 9:
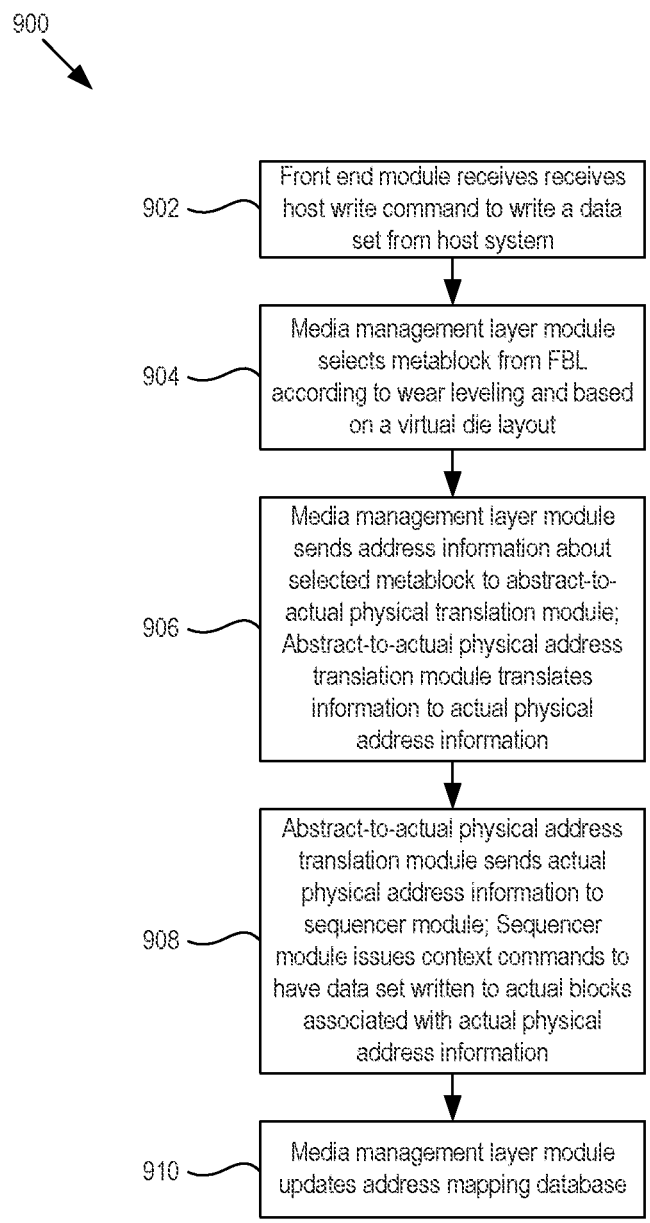
FIG. 9 is a flow chart of an example method of a non-volatile memory system executing a host write command to write a data set into non-volatile memory having a multi-die configuration, where a total number of the dies is a non-multiple of a die component of a multi-die interleave scheme being implemented by the non-volatile memory system for writing data into the non-volatile memory.

FIG. 9 is a flow chart of an example method 900 of a non-volatile memory system executing a host write command to write a data set into non-volatile memory having a multi-die configuration, where a total number of the dies is a non-multiple of a die component of a multi-die interleave scheme being implemented by the non-volatile memory system for writing data into the non-volatile memory. At block 902, a front end module of a non-volatile memory system may receive the host write command from a host system. At block 904, a media management layer module of the non-volatile memory system may select an abstract physical location (e.g., a metablock) from a free block list (FLB) in which to write the data. Since the non-volatile memory system is using a multi-die interleave scheme in which to write the data, then the metablock that is selected may correspond or be mapped to multiple actual blocks. The media management layer module may select the metablock from the free block list in accordance with a wear leveling scheme, as previously described. For example, the metablock that it selects may be associated with a metablock group that is different than a metablock group associated with a previous metablock that the media management layer module selected to write a prior data set into the non-volatile memory. The metalock groups may correspond to metaplanes that, in turn, are determined by and/or correspond to a virtual die layout that is different than an actual die layout of the non-volatile memory, in accordance with the virtual die layout features as previously described.

At block 906, the media management layer module may send identification information about the selected metablock (such as a metablock number) to an abstract-to-actual physical address translation module. In response, the abstract-to-actual physical address translation module may translate or convert the metablock information to an actual physical address that identifies the actual blocks associated with the selected metablock. In this sense, the abstract-to-actual physical address translation module translates the address of an abstract physical storage space that was selected based on a virtual die layout to an actual physical storage space corresponding to an actual die layout that is associated with the abstract physical storage space. In some example translations, the actual blocks that are determined may not all be in the same row of actual blocks. For example, the actual blocks may include one or more last blocks of one row, and one or more first actual blocks of a next or adjacent row of actual blocks. In addition, by performing the translation, the abstract-to-actual physical address translation module may determine a set of actual blocks identified by die number and block number pairs, as previously described. In addition or alternatively, the abstract-to-actual physical address translation module may perform the translation in accordance with equations (1) and (2) above.

At block 908, the abstract-to-actual physical address translation module may provide the actual physical address information it determined through the translation to a sequencer module of the non-volatile memory system. In response, the sequencer module may generate context commands based on the received information and issue the context commands to the appropriate dies to have the data set associated with the host write command programmed into the actual blocks corresponding to the actual physical address information. In turn, the data set may be loaded into data cache (e.g., latches) of the dies and then subsequently programmed into the actual blocks. At block 910, the media management layer module may update an address mapping database to associate the abstract address information (metablock address) with host (logical) address information identified in the host write command.

Figure 10:
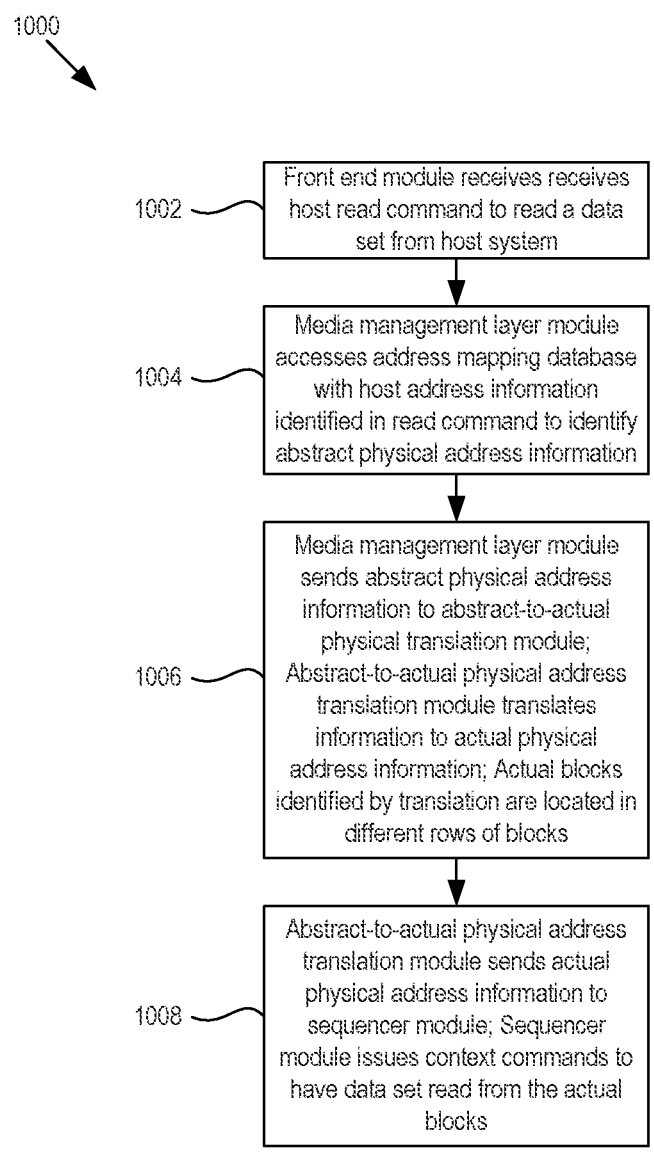
FIG. 10 is a flow chart of an example method of a non-volatile memory system executing a host read command to read a data set from non-volatile memory having a multi-die configuration, where a total number of the dies is a non-multiple of a die component of a multi-die interleave scheme being implemented by the non-volatile memory system for writing data into the non-volatile memory.

FIG. 10 is a flow chart of an example method 1000 of a non-volatile memory system executing a host read command to read a data set from non-volatile memory having a multi-die configuration, where a total number of the dies is a non-multiple of a die component of a multi-die interleave scheme being implemented by the non-volatile memory system for writing data into the non-volatile memory. The set that is to be read may have been written into the memory dies according to the multi-die interleave scheme. At block 1002, a front end module of the non-volatile memory system may receive the host read command from a host system. At block 1004, a media management layer module may access an address mapping database with host (logical) address information identified in the host read command. In response to accessing the address mapping database, the media management layer module may identify associated abstract physical address information (e.g., a metablock number).

At block 1006, the media management layer module may provide the abstract physical address information to an abstract-to-actual physical address translation module of the non-volatile memory system. In response, the abstract-to-actual physical address translation module may translate or convert the abstract address information to actual physical address information that identifies a plurality of actual blocks where the data set is being stored. At least one of the actual blocks may be in a different row of blocks than another of blocks associated with the abstract physical address information (e.g., associated with the metablock number). In addition, in some example methods, the abstract-to-actual physical address translation module may perform the translation in accordance with equations (1) and (2) above.

At block 1008, the abstract-to-actual physical address translation module may provide the actual physical address information it determined through the translation to a sequencer module of the non-volatile memory system. In response, the sequencer module may generate context commands based on the received information and issue the context commands to the appropriate dies to have the data set associated with the host read command read from the actual blocks corresponding to the actual physical address information. In some examples, reading the data may include sensing the data into data cache (e.g, latches), transferring (or copying) the data set into a RAM of the non-volatile memory system, and then transferring the data set in the RAM back to the host system in order to execute the host read command.

Other methods for reading and writing data may be possible. For example, some or all of the actions performed to read a data set as described with reference to FIG. 10 may be combined with some or all of the actions performed to write a data set as described with reference to FIG. 9.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A non-volatile memory system comprising:
non-volatile memory comprising a plurality of actual blocks arranged in a plurality of actual dies;
a controller configured to:
receive a host write command to write a data set;
select a metablock of a plurality of metablocks in which to write the data set;
in response to selection of the metablock, directly translate an address of the metablock to an actual physical address identifying where in the non-volatile memory to write the data set using a formula having as parameters: the metablock address, a total number of the plurality of actual dies of the non-volatile memory, and a die component number of a multi-die interleave scheme for the non-volatile memory system, wherein the physical address identifies a first actual block of a first actual die and a second actual block of a second actual die, and wherein the first block is located in a first row of actual blocks and the second block is located in a second row of actual blocks; and
communicate with the non-volatile memory to write a first portion of the data set into the first actual block and a second portion of the data set in the second actual block.

2. The non-volatile memory system of claim 1, wherein a number of actual blocks included in the metablock corresponds to the multi-die interleave scheme for the non-volatile memory system, wherein the total number of the plurality of actual dies of the non-volatile memory is a non-multiple of the die component number of the multi-die interleave scheme.

3. The non-volatile memory system of claim 2, wherein the controller is configured to select the metablock from a free block list identifying associations between the plurality of metablocks and a plurality of metablock groups according to a wear leveling scheme,
wherein the plurality of metablock groups corresponds to a virtual die layout that identifies a total number of virtual dies that is different than the total number of the plurality of actual dies.

4. The non-volatile memory system of claim 3, wherein the virtual die layout identifies a plurality of metaplanes, and wherein each of the metablock groups corresponds to one of the plurality of metaplanes.

5. The non-volatile memory system of claim 4, wherein a number of the plurality of metaplanes is set to the total number of virtual dies divided by the die component number.

6. The non-volatile memory system of claim 3, wherein the metablock comprises a first metablock that is associated with a first metablock group of the plurality of metablock groups, and wherein the controller is further configured to:
select a next metablock of the plurality of metablocks in which to write a next data set according to the wear leveling scheme, wherein the next metablock is associated with a second metablock group that is different than the first metablock group.

7. The non-volatile memory system of claim 3, wherein the total number of virtual dies is a multiple of the die component number.

8. The non-volatile memory system of claim 7, wherein the log base 2 of the total number of virtual dies is an integer, and the log base 2 of the total number of the plurality of actual dies is a non-integer.

9. The non-volatile memory system of claim 7, wherein the total number of virtual dies is set to the die component number multiplied by a quotient of the total number of the plurality of actual dies divided by the die component number.

10. The non-volatile memory system of claim 9, wherein a number of virtual blocks in each of the virtual dies is set according to a ratio of the total number of the plurality of actual dies to the total number of virtual dies.

11. The non-volatile memory system of claim 1, wherein the first and second rows of actual blocks are adjacent to each other.

12. The non-volatile memory system of claim 1, wherein the first actual block is a last block of the first row and the second actual block is a first block of the second row.

13. The non-volatile memory system of claim 1, wherein the controller is configured to identify an n-th actual die and an associated n-th actual block for each of an N-number of actual blocks associated with the metablock according to the following equations:

$$\text{Die}(n)_{MB} = \text{mod}((\text{mod}(\text{MBadd},D)*L)+n-1,D), \text{ and}$$

$$\text{Block}(n)_{MB} = \text{quotient}\left[\frac{(\text{mod}(MBadd, D)*L) + n - 1}{D}\right]$$

where $\text{Die}(n)_{MB}$ represents an n-th die number of an n-th actual block of the metablock, $\text{Block}(n)_{MB}$ represents an n-th block number of the n-th actual block of the metablock, n is an integer corresponding to the n-th ordinal number, MBadd represents a the metablock address of the metablock, D represents the total number of actual dies of the non-volatile memory, and L represents the die component number of a multi-die interleave scheme for the non-volatile memory system.

14. A method for executing host commands in a non-volatile memory system, the method comprising:
identifying, with a controller of the non-volatile memory system, a metablock address of a metablock associated with a virtual set of virtual die number and virtual block number pairs in which to write a data set;
in response to identification of the metablock address, directly translating, with the controller, the metablock address of the metablock to an actual physical address identifying an actual set of actual die and actual block pairs of non-volatile memory using a formula that has as parameters: the metablock address, a total number of actual dies of the non-volatile memory, and a die component number of a multi-die interleave scheme for the non-volatile memory system, wherein the actual set of actual die and actual block pairs comprises a first actual block of a first pair and a second actual block of a second pair that are located in different rows of actual blocks in the non-volatile memory, and wherein the actual set of actual die and actual block pairs is different than the virtual set of virtual die and virtual block pairs; and
after translating the metablock address, writing, with the controller, the data set to the actual set of actual die and actual block pairs.

15. The method of claim 14, wherein writing the data set comprises writing, with the controller, the data set to the actual set of actual die and actual block pairs according to the multi-die interleave scheme, wherein the total number of actual dies of the non-volatile memory is a non-multiple of a die component number of the multi-die interleave scheme.

16. The method of claim 15, further comprising:
selecting, with the controller, the metablock from a free block list that associates a plurality of metablocks of the non-volatile memory with a plurality of metablock groups according to a wear leveling scheme, wherein the plurality of metablock groups corresponds to a virtual die layout that identifies a total number of virtual dies that is different than the total number of actual dies.

17. The method of claim 14, further comprising:
receiving, with the controller, a host read request to read the data set, the read request identifying a host address associated with the data set;
accessing, with the controller, an address data structure that maps the host address to the metablock address in order to identify the metablock address;
translating, with the controller, the metablock address to the actual physical address; and
reading, with the controller, the data set from the actual set of actual die and actual block pairs associated with the actual physical address.

18. A non-volatile memory system comprising:
non-volatile memory comprising a plurality of actual blocks arranged in a plurality of actual dies;
a controller configured to:
write data to the plurality of actual blocks according to a multi-die interleave scheme, wherein a total number of the plurality of actual dies is a non-multiple of a die component number of the multi-die interleave scheme;
select an available metablock in which to write a data set based on a virtual die layout of the non-volatile memory, the virtual die layout identifying a plurality of virtual blocks associated with the available metablock; and
in response to selection of the available metablock, directly translate a metablock address of the available metablock to an actual physical address that identifies at least one actual block as being different than at least one of the plurality of virtual blocks, the translation performed using a formula that has as parameters: the metablock address, the total number of the plurality of actual dies, and the die component number of the multi-die interleave scheme.

19. The non-volatile memory system of claim 18, wherein the controller is configured to select the available metablock from a free block list that identifies associations between a plurality of metablocks and a plurality of metablock groups according to a wear leveling scheme, wherein a number of the plurality of metablock groups is based on a total number of virtual dies identified in the virtual die layout and the die component number of the multi-die interleave scheme.

20. The non-volatile memory system of claim 19, wherein the available metablock is associated with a first metablock group of the plurality of metablock groups, and wherein the controller is further configured to:

select, from the free block list, a next available metablock in which to write a next data set according to the wear leveling scheme, wherein the next metablock is associated with a second metablock group that is different than the first metablock group.

* * * * *